United States Patent [19]

Fukuoka et al.

[11] 4,004,918
[45] Jan. 25, 1977

[54] METHOD OF TREATING WASTE PRODUCED DURING STAINLESS STEEL MAKING

[75] Inventors: Hiroshi Fukuoka, Tokuyama; Teruhiko Kameyama, Shinnanyo; Yuji Takahashi; Kenji Nicho, both of Tokuyama; Tatsuo Misawa, Funabashi; Tsuneyuki Inoue, Ohmama; Kimiaki Imai, Ichikawa, all of Japan

[73] Assignees: Nissin Steel Co. Ltd.; Japan Metals & Chemicals Co. Ltd., both of Tokyo, Japan

[22] Filed: June 12, 1975

[21] Appl. No.: 586,375

[30] Foreign Application Priority Data

Sept. 4, 1974 Japan .......................... 49-100828

[52] U.S. Cl. ......................................... 75/11; 75/3; 75/25
[51] Int. Cl.² ................................................ C21C 5/52
[58] Field of Search ................ 75/3, 10 R, 4, 5, 29, 75/33, 36, 11; 134/10; 23/313 P

[56] References Cited

UNITED STATES PATENTS

| | | | |
|---|---|---|---|
| 1,312,218 | 8/1919 | Vogel | 75/3 |
| 1,536,033 | 4/1925 | Stillman | 75/3 |
| 2,176,689 | 10/1939 | Udy | 75/11 |
| 2,582,386 | 1/1952 | Komarek | 75/3 |
| 2,582,469 | 1/1952 | Udy | 75/11 |

FOREIGN PATENTS OR APPLICATIONS

| | | | |
|---|---|---|---|
| 1,039,546 | 9/1958 | Germany | 75/3 |
| 853,532 | 11/1960 | United Kingdom | 75/3 |

*Primary Examiner* — G. Ozaki
*Assistant Examiner* — Michael L. Lewis
*Attorney, Agent, or Firm* — Stevens, Davis, Miller & Mosher

[57] ABSTRACT

A method of treating waste produced during stainless steel making is disclosed. The method comprises the steps of kneading a sludge cake with a mixture of dust and scale to obtain a kneaded mass, adding an organic binder and eventually adding water with an inorganic binder to said kneaded mass, shaping said kneaded mass into a briquette, and heating said briquette at a low temperature. The briquette obtained can be used as a ferroalloy making raw material.

Metal oxides contained in the briquette are reduced by a dry reduction refining added with a carbonaceous reducing agent and eventually with a flux to separate usable metals.

8 Claims, 2 Drawing Figures

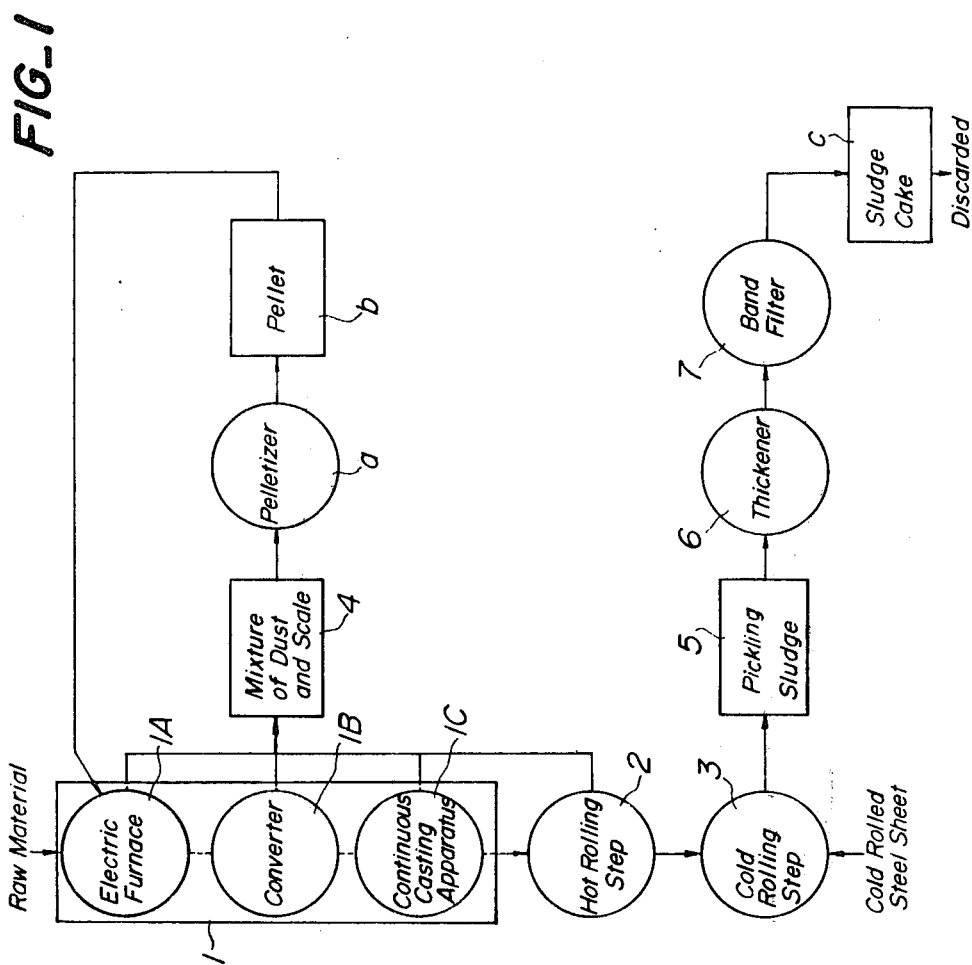

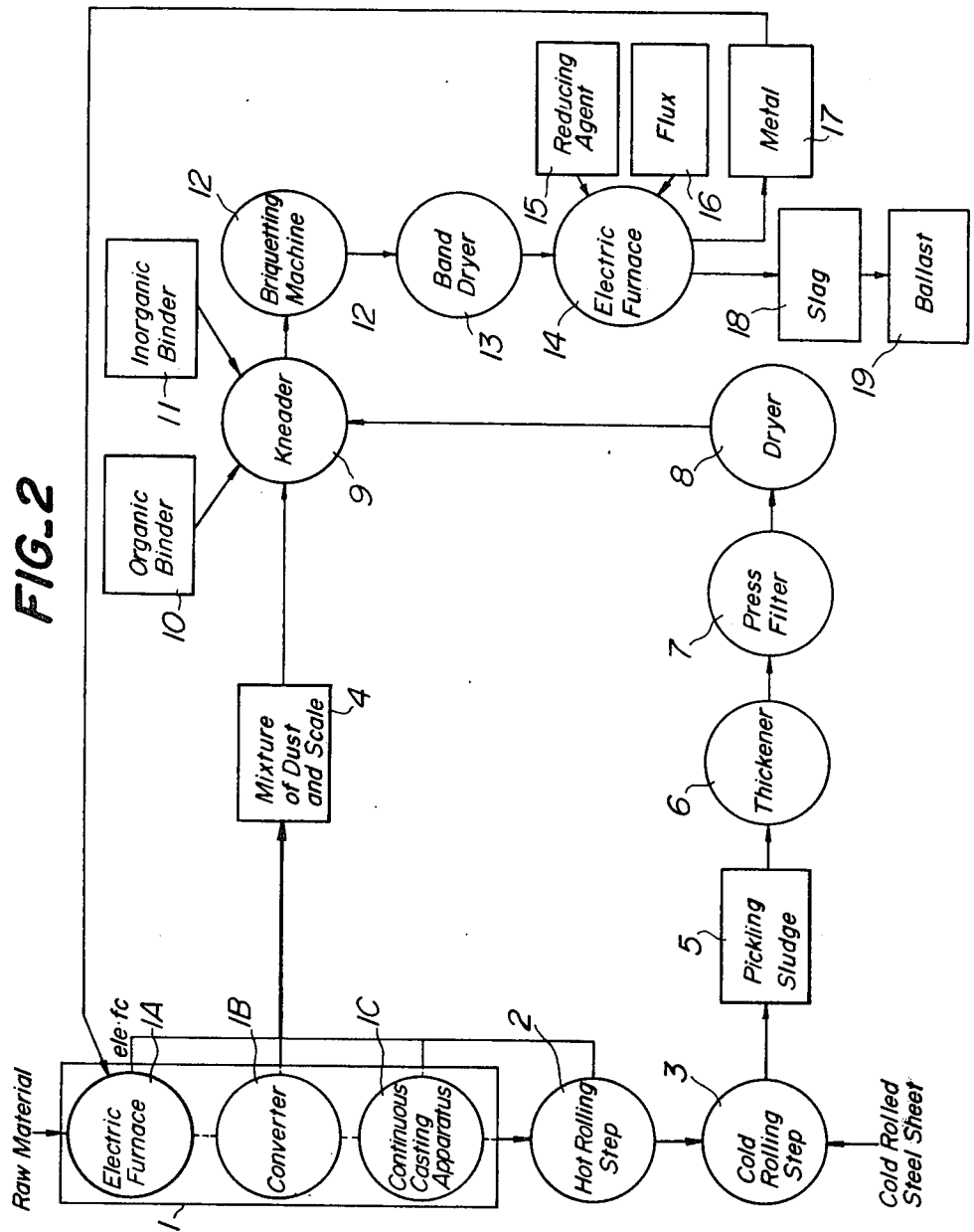

METHOD OF TREATING WASTE PRODUCED DURING STAINLESS STEEL MAKING

This invention relates to a method of treating waste such as dust, scale, sludge and the like produced during stainless steel making.

Waste such as dust, scale and sludge containing a large amount of oxides of usable metals such as nickel, chromium, iron and the like has generally been produced during stainless steel making and a rolling and the amount of such waste has arrived at 6 to 7% of the amount of yield of the crude steel.

A part of such waste has heretofore been utilized by treating it to a greater or lesser extent. The waste, however, is finely divided powder or dirty mud containing considerably large amounts of water. As a result, almost all this waste has been discarded and remained as it was after it has been treated in a simple manner.

The above mentioned conventional treatment of the waste will now be described in greater detail. In general, in the case of making stainless steel sheet, in the first place raw materials are melted, decarburized and refined in the steel making process to obtain an ingot or slab which is then hot rolled to provide a hot coil. The hot coil thus obtained is cold rolled to obtain a cold coil. In the steel making process, substantially during the raw material melting step or the decarburizing step, a large amount of dust is produced. The dust produced may be collected by either a dry or wet collecting method, but the dry dust collecting method is usually adopted. As a result, the dry dust is usually obtained.

In the hot rolling step, scale is produced and flaked off which is then collected as the waste. The scale thus collected is rinsed with high pressure water so that it is wet. But, water is quite easily separated from the scale. If the scale is left as it is, the amount of water contained in the scale becomes smaller than 10 wt.%. As a result, the scale may be handled in the same manner as a dry scale. In the following, the term scale shall be understood to include scale to be handled in the same manner as the dry scale from which water has been separated.

The hot coil obtained from the hot rolling step is subjected to the cold rolling step into to reduce it into a thinner cold coil. In order to remove the scale produced during the cold rolling step, provision is made of a pickling step which is effected during the cold rolling step. The scale removed by the pickling treatment is usually called a pickling sludge which is dirty mud whose slurry concentration is about 1 wt.%.

As stated hereinbefore, during the stainless steel making process there are produced three kinds of waste, mainly consisting of
1. a dry dust,
2. a hot rolling scale containing about 10 wt.% of water, and
3. a slurry-like pickling sludge containing about 99 wt.% of water.

Such waste is a finely divided powder or slurry-like liquid so that it is troublesome in handling and difficult to effectively utilize. As a result, it has been the common practice to discard the waste without positively utilizing it even though the waste contains a large amount of usable metals such as nickel, chromium, iron and the like. In addition, the waste contains a minute amount of hexa-valent chromium so that it is desirous to render the waste harmless as well as to find an effective use thereof.

In FIG. 1 is shown a flow diagram illustrating a conventional method of treating waste produced during the stainless steel making step. A mixture 4 of dust produced during a steel making step 1 which makes use of an electric furnace 1A, converter 1B and continuous casting apparatus 1C on the one hand and scale produced during a hot rolling step 2 on the other hand is converted into a pellet $b$ having a grain diameter of about 10 mm by means of a pelletizer $a$. The pellet $b$ is fed back into and re-used in the electric furnace 1A.

If the pellet charged into the electric furnace 1A is re-melted by electric current, substantially all the pellet $b$ is converted into its original finely divided powder which is then scattered and attracted into a dust collector (not shown), and as a result, substantially no effective utilization of the pellet $b$ can be attained.

A pickling sludge 5 produced during a pickling treatment in a cold rolling step 3 is a slurry-like liquid whose slurry concentration is about 1 wt.%. This slurry-like liquid is introduced into a thickener 6 in which use is made of a coagulant to increase the slurry concentration up to 5 to 10 wt.%. In addition, the concentrated slurry-like liquid is introduced into a belt filter or press filter 7 in which it is converted into a sludge cake $c$ containing 50 to 70 wt.% of water. Even though the sludge cake $c$ were subjected to the dehydration treatment, it still contains a large amount of water, and as a result, it is impossible to directly re-use the sludge cake $c$. As a result, almost all the sludge cake $c$ is piled and left as it is.

As stated hereinbefore, the waste produced during the stainless steel making step, that is, the mixture of dust and scale and the sludge contain a large amount of usable metals. The waste, however, is finely divided powder or dirty mud-like liquid so that substantially all the waste is left as it is. Under such circumstances, it has heretofore been desirous to solve the problem of effectively utilizing the waste for the purpose of saving raw materials as well as of preventing secondary public pollution due to generation of hexa-valent chromium ions.

An object of the invention is to provide a method of treating waste produced during stainless steel making, which can extract usable metals contained in the waste in an efficient manner and can re-use the extracted metals as steel making raw materials.

A feature of the invention is the provision of a method of treating waste produced during a stainless steel making process, comprising the steps of kneading a sludge cake containing 2 to 15 wt.% of water and obtained by drying a sludge cake containing 30 to 70 wt.% of water, that has been obtained by dehydrating a slurry-like pickling sludge produced during a pickling treatment in a stainless steel making process with a dry mixture of dust produced during the steel making and scale produced during a hot rolling step, in a kneader to obtain a kneaded mass, adding 1 to 5 wt.% of an organic binder and eventually adding less than 5 wt.% of inorganic binder based on solid components of said mixture of dust and scale and of said sludge cake and further adding water to said kneaded mass to adjust a water content of said kneaded mass to 8 to 20 wt.%, shaping said kneaded mass into a briquette by means of a briquetting machine, and heating said briquette at a low temperature, whereby said briquette is re-used as a ferroalloy making raw material.

Another feature of the invention is the provision of a method of treating waste produced during the stainless steel making process, wherein the above mentioned briquette is charged together with a carbonaceous reducing agent and eventually with a flux into an electric furnace in which a dry reduction refining is effected to extract a metal component from said briquette so as to re-use said metal component as a steel making raw material.

The invention will now be described in greater detail with reference to the accompanying drawings, wherein:

FIG. 1 is a flow diagram showing a conventional method of treating waste produced during a stainless steel making process; and FIG. 2 is a flow diagram showing a method of treating waste produced during the stainless steel making process according to the invention.

In FIG. 2 is shown a flow diagram illustrating a method of treating waste produced during the stainless steel making process according to the invention.

In FIG. 1, reference numeral 1 designates a steel making step which makes use of an electric furnace 1A, converter 1B and continuous casting apparatus 1C, 2 a hot rolling step, and 3 a cold rolling step. 4 illustrates a mixture of dust produced during the steel making step 1 and scale produced during the hot rolling step 2, 5 a pickling sludge produced during a pickling treatment in the cold rolling step 3, 6 a thickener for concentrating the pickling sludge 5, 7 a press filter for dehydrating the pickling sludge 5 concentrated by the thickener 6, 8 a dryer for drying a sludge cake of the pickling sludge 5 dehydrated by the press filter 7, and 9 a kneader for kneading the sludge cake dried by the dryer 8 with the mixture 4 of dust produced during the steel making step 1 and scale produced during the hot rolling step 2.

Reference numeral 10 designates an organic binder and 11 an inorganic binder, both the binders being added into the kneader 9 when the sludge cake from the dryer 8 is kneaded with the mixture 4 of dust and scale.

Reference numeral 12 designates a briquetting machine for converting the kneaded mass into a briquette or a pellet (in the following both the briquette and the pellet are called briquette for ease of illustration), 13 a band dryer for heating the briquette from the briquetting machine 12 at a low temperature to dehydrate it and increase its mechanical strength, and 14 an electric furnace into which is charged the briquette treated by the band dryer 13. The electric furnace 14 is one which is used for a conventional ferroalloy making step.

Reference numeral 15 designates a carbonaceous reducing agent charged into the electric furnace 14 for the purpose of separating metals 17 from the briquette, 16 a flux eventually charged into the electric furnace 14 for the same purpose as the reducing agent 15, 18 a slag produced in the electric furnace 14 and separated from the metal 17, and 19 a ballast obtained by crushing the slag 18 into various sizes.

The method of treating waste comprising the above mentioned steps according to the invention will now be described.

Raw materials having predetermined composition are charged and melted in the electric furnace 1A of the steel making step 1 and then decarburized and refined in the converter 1B. The refined material is converted into a slab by the continuous casting apparatus 1C.

In the steel making step 1, dust whose amount is about 3% of the amount of crude steel is produced. In this case, use is usually made of a bag filter so as to collect the dust in dry form.

The slab from the continuous casting apparatus 1C is hot rolled in the hot rolling step 2 into a hot coil. Scale formed on the surface of the slab during the hot rolling step 2 is removed by high pressure water. In this hot rolling step 2, scale whose amount is about 0.3% of the yield of the slab is produced. Water contained in the scale is very easily separated from the scale, and as a result, if the scale is left as it is, its water content becomes reduced to less than 10 wt.%. As a result, the scale can be handled as if it is dry, similarly to the dry dust produced during the steel making step 1. The scale is mixed with the dust to obtain the mixture 4 which is then introduced into the kneader 9.

The hot coil from the hot rolling step 2 is transferred to the cold rolling step 3 in which the hot coil is cold rolled. During this cold rolling step 3, an annealing treatment, pickling treatment and the like are effected.

In this pickling treatment is produced the slurry-like pickling sludge 5 which is then introduced into the thickener 6. The slurry concentration of the pickling sludge 5 is about 1 wt.%. The sludge 5 is concentrated by the thickener 6 by eventually adding a coagulant to increase the slurry concentration from about 1 wt.% to 5 to 10 wt.%. The sludge thus concentrated is introduced into the press filter 7 in which the concentrated sludge is dehydrated into a sludge cake containing 30 to 70 wt.% of water. The sludge cake thus obtained is introduced into the dryer 8 in which the sludge cake is dried at a low temperature with the aid of a petroleum fuel until the water content arrives at 2 to 15 wt.%.

The reasons why the water content of the pickling sludge is limited to 30 to 70 wt.% are as follows. It is necessary to make the water content of the pickling sludge as small as possible for the sake of economy of the fuel used in the succeeding drying step. However, it is difficult to cause the sludge to reduce its water content less than 30 wt.% by mechanical power due to the particle size and shape of the solid raw material. On the contrary, if the water content exceeds 70 wt.%, the fuel consumed in the succeeding drying step becomes excessively large which is not preferable for the sake of fuel economy.

In addition, the reasons why the water content of the sludge cake from the dryer 8 is limited to 2 to 15 wt.% are as follows. In order to make the water content of the sludge cake less than 2 wt.%, the dryer is required to increase its capacity, the amount of fuel consumed becomes increased and hence provides a material increase in operating cost, and the dried powder is liable to be scattered.

On the contrary, if the water content of the sludge cake exceeds 15 wt.% the, presence of much amount of water results in difficulty of effecting the succeeding briquetting step.

The sludge cake containing 2 to 15 wt.% of water and delivered from the dryer 8 is introduced into the kneader 9 at the same time when the above mentioned mixture 4 of dust and scale is introduced into the kneader 9. Into the kneader 9 are added the organic binder 10 and eventually the inorganic binder 11 which are required to shape a briquette from the kneaded mass.

The organic binder 10 is added into the kneader 9 for the purpose of increasing the mechanical strength of the briquette. Examples of the organic binder 10 are a pulp waste liquid, molasses, tar emulsion, carboxymethyl cellulose (CMC) and the like.

The inorganic binder 11 is added into the kneader 9 for the purpose of increasing the high temperature mechanical strength of the briquette when it is used for refining the ferroalloy. Examples of the inorganic binder 11 are bentonite, pozzuolan and the like.

The amount of the organic binder 10 to be added into the kneader 9 may be 1 to 5 wt.% based on the amount of water-free solids in the kneaded mass. The amount of the inorganic binder 11 to be eventually added into the kneader 9 may be less than 5 wt.% based on the amount of water-free solids in the kneaded mass.

The organic binder 10 serves to bond the briquettes sufficiently. The reasons why the amount of the organic binder 10 added into the kneader 9 is limited to 1 to 5 wt.% are as follows. If the amount of the organic binder 10 is less than 1 wt.%, the briquettes are not fully bonded. On the contrary, if the amount of the organic binder 10 exceeds 5 wt.%, the mechanical strength of the briquette becomes slightly increased, but the operating cost becomes expensive. In addition, impurities are increased.

The inorganic binder 11 serves to increase the mechanical strength of the briquette. The reasons why the amount of the inorganic binder 11 is limited to less than 5 wt.% are as follows. If the amount of the inorganic binder 11 exceeds 5 wt.%, the mechanical strength of the briquette is not so much increased although the operating cost becomes excessively high and impurities are increased.

In the kneader 9, it is required that the organic binder 10 and the inorganic binder eventually added are fully kneaded with the kneaded mass to adjust the water content of the kneaded mass to 8 to 20 wt.% for the purpose of shaping it into briquettes in the next step.

If the water content of the kneaded mass is adjusted to 8 to 20 wt.%, it is possible to sufficiently effect the kneading operation and obtain a kneaded mass having a caking property and hardness which are suitable for shaping the kneaded mass into the briquette.

The reasons why the water content of the kneaded mass is limited to 8 to 20 wt.% are as follows. If the water content of the kneaded mass is less than 8 wt.%, the briquette obtained is liable to be cracked. On the contrary, if the water content of the kneaded mass exceeds 20 wt.%, the surface of the kneaded mass becomes smeared with water, thereby rendering it difficult to separate the kneaded mass from a briquetting mold.

The kneaded mass sufficiently kneaded by the kneader 9 and consisting of the mixture of the dust and scale, sludge, organic binder and eventually added inorganic binder is charged into a briquetting machine 12 in which the kneaded mass is shaped under a pressure of 1,000 to 4,000 Kg/cm$^2$ into a briquette. The briquette shaped by the briquetting machine 12 contains 8 to 20 wt.% of water and has a small squeezing strength so that it is heated at a low temperature by means of the band dryer 13 to decrease the water content and increase the squeezing strength. The water content of the briquette heated at the low temperature by the band dryer 13 becomes less than 5 wt.% and the squeezing strength thereof becomes on the order of 50 Kg/unit.

This briquette may be used as a ferroalloy making raw material.

In addition, the briquette from the band dryer 13 is charged together with a carbonaceous reducing agent 15 and eventually with a flux 16 into an electric furnace 14 in which metal oxide contained in the briquette is reduced to separate metals 17 such as chromium, nickel, iron and the like therefrom.

Examples of the carbonaceous reducing agent 15 are charcoal, coke and the like.

Examples of the flux 16 are silica, caustic lime and the like.

The electric furnace 14 serves to effect a reducing operation which is the same as that effected in the conventional ferroalloy making method.

In the electric furnace 14 the metals 17 are separated from the slag 18 and tapped out of it.

The metal 17 reduced in the electric furnace 14 is a nickel-chromium ferroalloy containing carbon on the order of 3 wt.%, and as a result, the metal 17 can be re-used as a good steel making raw material.

The slag 18 showed no hexa-valent chromium and has a high hardness and mechanical strength, and as a result, the slag 18 can be crushed into various sizes to effectively be used as a ballast 19.

As stated hereinbefore, the method of treating the waste according to the invention can treat the waste which is finely divided powder or dirty mud and hence extremely difficult in handling, to extract usable metals contained in the waste, thereby reusing such metals as a good steel making raw material. As a result, the invention provides an economical way of reducing the stainless steel making cost, which is simple in operation and which can be fully automated. In addition, the method according to the invention can prevent a public pollution caused by hexa-valent chromium ion produced from the waste, can make the slag separated from the metal harmless and thus renders it possible to effectively utilize the slag as a ballast. Thus, the method according to the invention can significantly save the raw materials and provides an extremely effective measure which can prevent a public pollution. Thus, the invention contributes greatly to the industry.

The invention will now be described with reference to a practical example.

EXAMPLE

In the present example, use was made of a waste composed of the mixture of dust produced during the steel making step and scale produced during the hot rolling step on the one hand and the pickling sludge on the other hand to extract metals therefrom according to the invention.

In the following Table 1 are shown the water content and the chemical composition of the mixture of dust and scale as well as the water content and the chemical composition of the sludge cake obtained by dehydrating the pickling sludge by means of the thickener and press filter.

Table 1

| | Water content (wt.%) | Chemical composition* (%) | | | | | | |
|---|---|---|---|---|---|---|---|---|
| | | Total Cr | Total Ni | Total Fe | CaO | $SiO_2$ | MgO | $Al_2O_3$ | Remainder |
| Mixture of dust and scale | 3.2 | 8.85 | 1.61 | 37.0 | 9.28 | 6.03 | 9.0 | 1.18 | 11.09 |
| Sludge cake | 54.6 | 9.66 | 1.49 | 37.6 | 10.0 | 3.32 | 0.29 | 2.35 | 19.63 |

Note: *designates the chemical composition in wt.% based on the dry amount excluding the water content.

Total Cr, total Ni and Total Fe show total amount of Cr, Ni, and Fe contained in respective oxides.

The remainder of the sum of the chemical composition is the amount of oxygen contained in the oxides.

The sludge cake having the water content and the chemical composition shown in the above Table 1 was dried by means of a rotary dryer having dimensions shown in the following Table 2 in an atmosphere whose center temperature was 350° C to obtain a sludge cake containing 3.5 wt.% of water.

Table 2

| | |
|---|---|
| Inner diameter of dryer (mm) | 600 |
| Outer diameter of dryer (mm) | 800 |
| Length of dryer (mm) | 4,600 |
| Number of revolution of dryer (r.p.m.) | 3.4 |

The mixture of dust and scale having the water content and chemical composition shown in the above Table 1 and the sludge cake containing 3.5 wt.% of water were introduced into and kneaded in a kneader into which were added a pulp waste liquid as an organic binder, bentonite as an inorganic binder and further water to obtain a kneaded mass. The kneaded mass thus obtained was shaped into a briquette by means of a briquetting machine. These kneading and briquetting steps were effected under conditions shown in the following Table 3.

Table 3

| | Experiment number 1 | Experiment number 2 |
|---|---|---|
| Amount of raw material used* (Kg) | 1,150 | 1,100 |
| Amount of bentonite added (Kg) | 32.5 | 33.0 |
| Amount of pulp waste liquid added (Kg) | 34.8 | 33.9 |
| Amount of water added (Kg) | 126 | 118 |
| Molding pressure (Kg/cm²) | 3,000 | 3,000 |

Note: *The amount of raw material used designates amount of the raw material which contains no water.

The briquette thus shaped was dried by means of a band dryer under conditions shown in the following Table 4 and obtained dried briquettes each having a squeezing strength shown in the following Table 4.

Table 4

| | Experiment number 1 | Experiment number 2 |
|---|---|---|
| Layer thickness of briquette during drying (mm) | 80 | 100 |
| Temperature of atmosphere (° C) | 330 | 350 |
| Drying time (min) | 60 | 60 |
| Surface temperature of briquette after drying (° C) | 85 | 80 |
| Squeezing strength of briquette after drying and natural cooling (Kg/unit) | more than 55 | more than 50 |

The dried briquettes of the experiment numbers 1 and 2 were mixed together to obtain a mixture. The mixture thus obtained was charged together with silica as a flux and coke breeze as a carbonaceous reducing agent into a Jirod furnace having dimensions shown in the following Table 5 to effect a dry reduction refining step under conditions shown in the following Table 6 to obtain metals whose yields were also shown in the following Table 6.

Table 5

| | |
|---|---|
| Capacity of transformer (KVA) | 55 |
| Inner diameter of furnace (upper part) (mm) | 350 |
| Inner diameter of furnace (lower part) (mm) | 250 |
| Inner depth of furnace (mm) | 350 |
| Secondary voltage (V) | 27.5 |
| Secondary current (A) | 1,820 |

Table 6

| Amount of briquette used (Kg) | Amount of silica used (Kg) | Amount of coke breeze used (Kg) | Electric power used (KWH/Metal·Ton) | Yield of metals (%) | | |
|---|---|---|---|---|---|---|
| | | | | Fe | Ni | Cr |
| 1,000 | 92 | 345 | 2,600 | 99.6 | 98.6 | 85.1 |

Compositions of the metal and the slag obtained were those shown in the following Tables 7 and 8, respectively.

Table 7

| C (%) | Si (%) | Mn (%) | P (%) | S (%) | Ni (%) | Cr (%) | Fe and the remainder (%) |
|---|---|---|---|---|---|---|---|
| 4.12 | 3.62 | 1.06 | 0.067 | 0.063 | 2.97 | 14.85 | 73.25 |

Table 8

| FeO (%) | $Cr_2O_3$ (%) | CaO (%) | MgO (%) | $SiO_2$ (%) | $Al_2O_3$ (%) | The remainder (%) |
|---|---|---|---|---|---|---|
| 2.31 | 3.95 | 32.11 | 9.84 | 34.01 | 6.02 | 11.76 |

As shown in the above Table 6, the use of measures described above ensures a recovery of usable metals such as Fe, Ni and Cr with such high yields as 99.6%, 98.6% and 85.1%, respectively.

What is claimed is:
1. A method of treating waste produced during stainless steel making and processing, comprising:
 forming a sludge cake containing 2–5 weight percent water by dehydrating slurry-like pickling sludge containing 30–70 weight percent water produced during pickling treatment in connection with a cold rolling step of stainless steel processing;
 kneading the sludge cake containing 2–15 weight percent water with a mixture of dust produced during stainless steel making and scale produced during a hot rolling step of stainless steel processing, thereby obtaining a kneaded mass;
 adding to said kneaded mass 1 to 5 weight percent of an organic binder and less than 5 weight percent of an inorganic binder, said weight percents being based upon the solid components of said kneaded mass;
 adjusting the water content while kneading to obtain a water content in the range of 8 to 20 weight percent of the total kneaded mass;
 shaping the kneaded mass under pressure into the form of a briquette;
 heating the briquette to reduce its water content;
 charging one or more briquettes, together with a carbonaceous reducing agent into an electric furnace for pyrometallurgically reduction refining to exact metal from such briquettes.

2. A method of treating waste produced during stainless steel making and processing as claimed in claim 1, wherein said briquette is charged together with a carbonaceous reducing agent and with a flux into the electric furnace in which refining is effected to extract a metal component from said briquette to reuse said metal component as a steel making raw material.

3. A method of treating waste produced during a stainless steel making and processing as claimed in claim 1, wherein said organic binder comprises a pulp waste liquid, molasses, tar emulsion, or carboxymethyl cellulose.

4. A method of treating waste produced during a stainless steel making and processing as claimed in claim 1, wherein said inorganic binder comprises bentonite or pozzuolan.

5. A method of treating waste produced during a stainless steel making and processing as claimed in claim 1, wherein said kneaded mass is shaped under a pressure of 1,000 to 4,000 Kg/cm$^2$ into said briquette.

6. A method of treating waste produced during a stainless steel making and processing as claimed in claim 1, wherein said briquette after heating contains less than 5 wt.% of water and has a squeezing strength on the order of 50 Kg/unit.

7. A method of treating waste produced during a stainless steel making and processing as claimed in claim 1, wherein said carbonaceous reducing agent comprises charcoal or coke.

8. A method of treating waste produced during a stainless steel making and processing as claimed in claim 1, wherein said flux comprises silica or caustic lime.

* * * * *